Jan. 15, 1946.  S. M. FAIRCHILD  2,392,844
STRUCTURAL UNIT AND METHOD OF MAKING STRUCTURES THEREWITH
Filed April 16, 1941

INVENTOR
SHERMAN M. FAIRCHILD
BY
ATTORNEYS

Patented Jan. 15, 1946

2,392,844

UNITED STATES PATENT OFFICE 2,392,844

STRUCTURAL UNIT AND METHOD OF MAKING STRUCTURES THEREWITH

Sherman M. Fairchild, New York, N. Y., assignor, by mesne assignments, to William B. Scarborough, Englewood, N. J., as trustee Application April 16, 1941, Serial No. 388,812

12 Claims. (Cl. 144—309)

This invention pertains to the art of molding wood or the like material.

The invention comprises a novel molded structure, and a novel method of producing the same. It is particularly adapted to molding skins or shells of wood or the like material to complex contours, involving sharp simple or compound curvatures, which may include areas with reversed curvatures. More particularly, the practice of the invention comprises supplying the material of the assembly in small pieces, each piece embodying a small portion of the mass of the assembly to be molded. In the case of wood being the material molded, small pieces of veneer are adhered together to comprise the assembly.

The usual prior art practice of molding wood is to use strips of veneer as the component layup pieces of an assembly, each strip being long enough to extend from border to border of the assembly. Opposite ends of each layup piece are extended somewhat beyond the borders of the assembly, and each piece is held in its allotted position in the assembly by temporary holding means. These usually comprise tacks or staples driven into the die through the projecting end area of the strip. After the assembly has been fabricated, the border material containing the tacks is trimmed away to bring the assembly to the desired peripheral contour.

In the case of the present invention each of the component layup pieces of material is small enough to lie entirely within the border of the assembly. The several pieces are laid up, each piece being positioned in its allotted place in the assembly, and held in place by suitable temporary holding means until the pieces are permanently adhered together. None of the pieces extend from border to border of the assembly. Tacks are preferably eliminated as the means for temporarily holding the respective pieces in position preparatory to the assembly being molded.

Under prior art practice of layup pieces being used comprising strips of veneer, proximate edges of adjacent strips are fayed and are adhered together in abutting relationship in the fabrication of the assembly. The faying operation is time consuming and requires great skill, and the laying up operation is costly. Furthermore, care must be exercised during subsequent fabricating steps to prevent adjacent strips from shifting out of fayed relationship before the assembly is molded. Therefore, all steps in the molding operation require great care and skill, and the cost of fabrication is accordingly great.

In the practice of the present invention, butt joints between adjacent layup pieces are eliminated. The edges of each piece are bevelled or scarfed throughout the periphery thereof, and adjacent pieces are laid up with proximate edges overlapping. The location of each piece in the layup need not be as precise as under prior art practice, and slight shifting of the several pieces, such for example as necessarily takes place in the molding operation of pressing the assembly against a rigid die surface, does not operate to produce defective joints between adjacent pieces. Whereas, under prior art practice, great care is exercised to inhibit shifting of the layup pieces in the molding operation in order to avoid relative shifting between pieces which throws them out of fayed relationship and causes defective butt joints, under practice of the present invention it is desirable that the several layup pieces be permitted to shift freely under the molding pressure. With the several layup pieces able to shift under the molding pressure, there is closer surface to surface contact between pieces to produce firmer bonding, and the assembly hugs the die surface more closely, reproducing its contour with greater fidelity.

In accordance with the present invention, component layup pieces are provided which may be of standard shape and size and are substantially universally usable in the production of a great many articles of widely varying shape. These layup pieces may be assembled by relatively unskilled labor and without the delays attendant upon accurate fitting or joining of the parts. Multiple ply or laminated articles having compound or intersecting curvatures may be readily assembled in or on suitable forms and the shape of the completed article is dependent only upon the shape of the form or mold.

More particularly, the layup pieces, which may be made of wood, synthetic plastic material, "fibre," and the like, may have any suitable peripheral contour, but preferably are of generally oval shape. The pieces taper in cross-section from a thicker center portion to very thin edges so that the pieces 14 may be laid with their edges in overlapping relationship without rendering the overlapped portions appreciably thicker than the center portion of a single ply. Each layup piece is feathered or scarfed throughout its peripheral edges, so that opposite faces of the piece comprise continuous surfaces of substantially regular contours, which meet at sharp angles at any point along the peripheral edges. By this means the edge of any given piece does not overlie a precipitous edge of the adjacent piece at overlaps, and the several pieces are not subjected to sharp deformation at their overlapping edges under the molding pressure, such as would lacerate the material.

The component pieces being relatively small, they can be flexed into complex contours in or on a form without buckling, even when the form has curves of relatively short radii. The operation of making the layup preparatory to the molding operation can be performed by relatively unskilled labor, more quickly and at less cost than under conventional prior art practice, because the layup operation does not require the skill and care necessary to produce precise faying of proximate edges of adjacent pieces.

Prior to or during the layup, the several layup pieces are coated with a suitable adhesive, either wet or dry, preferably prior to the layup. The preferred practice is to prefabricate a stock of layup pieces with adhesive applied, preparatory to the layup operation. Preferably a heat-responsive adhesive, of the resin or synthetic resin type is used. This renders the laminated finished article waterproof and relatively non-inflammable.

The staples or tacks which are usually employed under prior art practice of molding wood or the like material to hold the component pieces of a layup in their severally allotted positions are preferably not employed in the practice of the present invention. Instead, it is preferred to hold the several layup pieces in position preparatory to the molding operation by adhering each piece in its allotted position, using a suitable adhesive.

For a more complete understanding of the present invention, reference may be had to the accompanying drawing, in which.

The present invention will be described by way of illustration as used in the production of a cowling or nose piece 10 for an airplane. The nose piece 10 is generally oval-shaped in plan and has a transverse curvature rendering it of concavo-convex form. In the upper section of the nose piece is provided a circular flange or faring 11, which is streamlined into and is disposed directly behind the propeller hub (not shown). In the lower section of the nose piece there is a generally triangular opening 12 for admitting air for cooling the engine, and in the left-hand section is a second generally circular aperture 13 for admitting air for other purposes. This type of structure member is very difficult to manufacture from plywood because of its complicated curvatures which are of relatively short radii. Moreover, because it is irregular in shape, considerable difficulty is met in cutting and fitting plywood strips together to form a smooth shell of the desired curvature in which the edges of the strips fit together accurately and satisfactorily to provide a uniformly strong structure.

Figure 3:
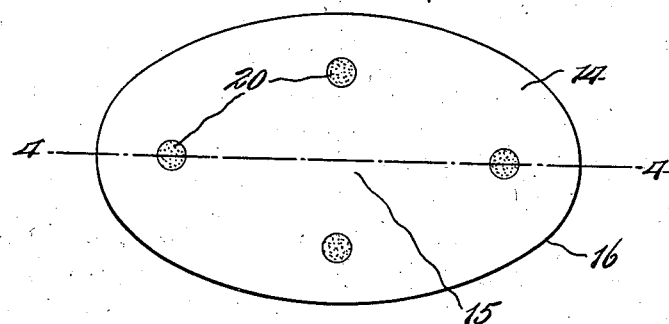
Fig. 3 is a plan view of a typical form of a layup piece embodying the present invention.
Figure 4:
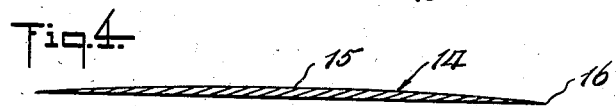
Fig. 4 is a view in section of the layup piece disclosed in Fig. 3 taken on line 4—4 of Fig. 3.

In accordance with the present invention, such a nose piece or cowling may be readily produced by means of layup pieces 14 of the type disclosed in Figs. 3 and 4 of the drawing. These layup pieces preferably consist of thin straight grain pieces of wood which, in the embodiment shown, are shaped into the form of an oval, but other fibrous materials may be used, if desired. The pieces may have any suitable peripheral contour, but it is preferred that there be no sharp corners at any point along the periphery of any given piece. All portions of the peripheral contour are preferably rounded or curved, as shown. The layup pieces 14 may have various dimensions, as may be desired, and several different sizes may be provided, depending upon the size and curvature of the article to be produced. An ovate layup piece about six inches in its shorter diameter and about ten inches in length is satisfactory for general use, although the dimensions may be varied as the purpose demands.

The center portion 15 of each layup piece 14 may be on the order of about $\frac{1}{16}$" in thickness, with its edges smoothly scarfed to form thin feathered edges 16. Two layup pieces 14 may thus be assembled in partially overlapping relationship without rendering such an assemblage appreciably over $\frac{1}{16}$" thick at its thickest portion.

Figure 1:
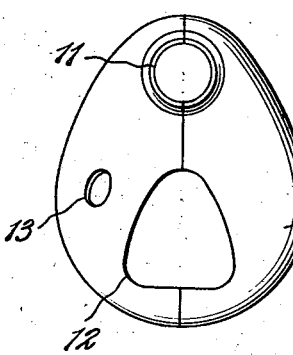
Fig. 1 is a view in front elevation of a nose piece or cowling for an airplane illustrative of the types of articles which may be produced in accordance with the present invention.
Figure 2:
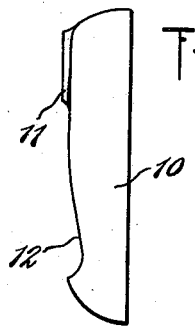
Fig. 2 is a view in side elevation of the nose piece disclosed in Fig. 1.
Figure 5:
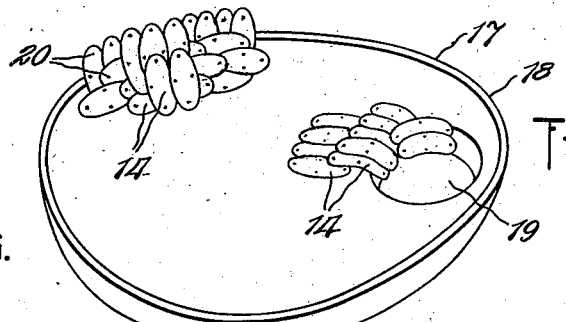
Fig. 5 is a perspective view illustrating the manner of fabricating the cowling of Figure 1.
Figure 6:
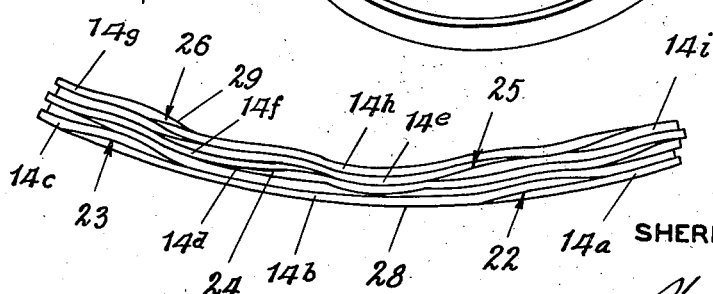
Fig. 6 is a fragmentary view in section illustrating the relationship of the several layup pieces in an article fabricated in accordance with practice of the present invention.

Illustrative of the manner in which the layup may be made in the die 17, reference is made to Figs. 5 and 6, in which Fig. 5 illustrates a concave die or mold 17 of generally oval or egg shape, the forming surface of the die 17 corresponding with the shape of the outer surface of the engine cowling 10, disclosed in Figs. 1 and 2, and having a depth slightly greater than the depth of the nose piece or cowling 10. At the more sharply curved end 18 of the mold 17 is a depressed portion 19 having an internal diameter substantially equal to the external diameter of the flange 11 on the cowling or nose piece 10. The depressed portion 19 preferably is considerably deeper than the height of the flange 11 for a purpose presently to be described.

In order to facilitate the application of the layup pieces 14 to the mold 17 and to cause them to bond together, the layup pieces are preferably pre-coated with a suitable adhesive, either wet or dry. For example, a heat-responsive resin has been found suitable, as it may be applied in the plastic state or as an emulsion or the like, during manufacture of the pieces 14, and when hard or dry, enables the pieces 14 to be assembled in a dry state. Thus, if the adhesive selected is a resin of the thermosetting type, it may be applied by spraying or painting, or in any other desired way in a partially set or condensed condition, and then dried without completing the setting. If the resin is of the thermoplastic type, it may be applied to the layup pieces 14 in a heat-softened condition, so that it will spread smoothly and form a thin film. The term "heat-responsive resin" used herein is intended to include thermosetting and thermoplastic resins, inasmuch as either may be used with success in bonding the pieces 14 together.

In order to maintain the layup pieces 14 in their allotted positions during their application to the mold, small spots 20 of a normally tacky adhesive, such as rubber cement, may be applied to opposite surfaces of the layup pieces 14. Thus, when the layup pieces 14 are placed in the die 17 in overlapping relationship, they will stick to each other and thus be retained in superimposed relationship. As indicated in Fig. 5, the layup pieces 14 may be laid in a series of overlapping layers around the interior of the mold 17.

The preferred practice is to lay up a layer of layup pieces 14 on the forming surface of the die 17. This corresponds with the layup of a ply under conventional practice. The several pieces in the ply are laid in any suitable pattern, with proximate edges of adjacent pieces overlapping each other, so that preferably the entire forming surface of the die is covered. This constitutes the outside face ply of the assembly. Thus, as will be noted in Figure 6, the layup pieces 14a, 14b, and 14c are laid side by side, with proximate edges of adjacent pieces overlapping each other as at 22 and 23.

Additional core plies are laid one on top of the other to attain the desired thickness of layup. These comprise additional layup pieces 14, such as pieces 14d, 14e, and 14f of Figure 6, which are laid side by side in each ply, with proximate edges of adjacent pieces overlapping as at 25.

The preferred practice is to lay the several pieces of any given ply with their grain running generally in the same direction. Thus, when the grain of each piece is in the general direction of its longitudinal axis, all of the pieces in any given ply will have their longitudinal axes approximately parallel.

Finally, the inside face ply is laid up on the last core ply. In Figure 6, the inner face ply comprises the layup pieces 14g, 14h, and 14i, laid side by side with proximate edges of adjacent pieces overlapping as at 26.

Preferably each ply is laid up with the grains of the component pieces 14 in alternate plies laid at angles to each other and in each instance to the preceding ply. In fact, the pieces 14 may be arranged in any desirable fashion. Thus, if the pieces 14 are so constructed that the grain of the wood extends in the direction of the greater diameter of each piece, it is possible to very readily position the layup pieces so that the grains in adjacent plies will intersect or cross the grain of the under pieces 14, thereby strengthening the article in all directions.

By applying a plurality of layers of the layup pieces 14 over the interior of the mold 17, as shown in Fig. 5, it is possible to produce a compound curvature corresponding to the internal shape of the mold. The plies may be laid into the recess 19 with their lowermost ends engaging the bottom of the recess 19 so as to form an elongated neck or flange of greater length than the flange 11 on the finished cowling.

When the layup pieces 14 have been laid within the mold 17 to complete the assembly, the layup is covered by an impervious sheet which is sealed to the mold around its perimeter and the whole is placed in a chamber and subjected to the heat of steam, for example, in the manner disclosed in greater detail in the Potchen et al. Patent No. 2,308,453, dated January 12, 1943. The heat causes the synthetic resin to flow into and to bond the pieces 14 closely together into a substantially unitary body, and the pressure causes them to conform to each other and the form. The pieces themselves may slide slightly to adjust themselves into the most closely associated positions, and will be bent to conform closely to the contour of the mold. This adjustment of layup pieces of relatively small area within the plywood structure does not create unequal stresses, but instead equalizes the stresses exerted on all of the plies.

The assembly, fabricated in the manner hereinbefore described, will be of substantially uniform thickness throughout. The several component pieces will be more firmly bonded together because, each piece being of limited extent, no piece can become locked against the die surface at spaced apart points under the molding pressure to prevent intermediate points from shifting in the molding operation. For a like reason, the contour of the surface 28, Figure 6, will more accurately conform with the forming surface of the die. The inside face surface 29 of the assembly will be irregular, as shown in Figure 6, but in general will conform with an area parallel to the outside face surface 28. Surface irregularities will be confined to the inner face surface 29, and this does not detract from the usefulness of the assembly, nor in any way impair the strength properties of the fabricated part.

When the molding operation is completed, in the manner described, the completed nose piece 10 may be removed from the mold, the exterior surface thereof buffed or sanded, if desired, to provide an absolutely smooth surface, and the flange portion formed in the recess 19 may be sawed off to proper height to form the flange 11. Likewise, the ventilation openings 12 and 13 may be sawed in the body 10 and, if desired, the entire assembly may be split down the middle in order to facilitate installation on or removal from the fuselage of the plane.

Inasmuch as it is unnecessary to fit the layup pieces 14 in edge-to-edge relationship throughout their extent, relatively unskilled labor can be used for assembling these elements. After the relative locations of the various plies have been determined, that assembly pattern may be followed in a routine fashion in order to provide duplicate parts as to shape and contour, as well as strength, thereby greatly expediting the production of plywood articles of complicated form.

From the foregoing description of a typical form of layup piece and method utilizing such layup pieces, it will be apparent that a very simple and practical procedure for preparing plywood articles is provided by the present invention. It will be understood, of course, that the size of the layup pieces may be varied without departing from the invention, and that layup pieces may be laid in or on a form in various ways to produce the most satisfactory construction. Therefore, the form of the invention described above should be considered as illustrative only and not as limiting the scope of the following claims.

I claim:

1. A ply member for use in multiple in making laminated articles comprising a thin, substantially oval-shaped piece of fibrous material of decreasing thickness from its center to its edges, a coating of a heat-responsive resin on said piece and small areas of a normally tacky adhesive distributed over the surfaces thereof.

2. A ply member for use in multiple in making plywood articles comprising a small, thin piece of wood which tapers in thickness from a thicker center portion to thinner edge portions, a thin film of a heat-responsive resin on the surfaces of said piece and small areas of a normally tacky adhesive distributed over the surfaces of said piece.

3. A structural assembly of molded wood or the like material, comprising a plurality of thin pieces of the material, the pieces being bevelled to sharp angles between opposite faces throughout their peripheries, the several pieces being disposed spread to cover the area of the assembly, with edges of adjacent pieces contacting each other in overlapping relationship, the several pieces being adhered together along surfaces of contact between pieces.

4. A structural assembly of molded wood or the like material, comprising a plurality of thin pieces of the material, each piece having curved edges throughout its periphery, the pieces being bevelled to sharp angles between opposite faces throughout their peripheries, the several pieces being disposed spread to cover the area of the assembly, with edges of adjacent pieces contacting each other in overlapping relationship, the several pieces being adhered together along surfaces of contact between pieces.

5. A structural assembly of molded wood or the like material, comprising a plurality of thin pieces of the material, the pieces being bevelled to sharp angles between opposite faces throughout their peripheries, the several pieces being disposed spread to cover the area of the assembly to a thickness comprising a plurality of pieces, faces of the several pieces contacting each other in edge overlapping and face to face relationship, the several pieces being adhered together along surfaces of contact between pieces.

6. A structural assembly of molded wood or the like material formed to a predetermined curved surface contour, and comprising a plurality of thin pieces of the material, the pieces being bevelled to sharp angles between opposite faces throughout their peripheries, the several pieces being disposed spread to cover the area of the assembly, with edges of adjacent pieces contacting each other in overlapping relationship, the several pieces being adhered together along surfaces of contact between pieces, one surface of the assembly being curved regularly to provide the predetermined surface contour, the opposite surface being irregular in accordance with differences in thickness of the assembly at different portions of its area.

7. The method of fabricating a structural assembly of molded wood or the like material, which comprises providing a plurality of thin pieces of the material each bevelled to sharp angles between its opposite faces throughout its periphery, applying an adhesive to the pieces, spreading the pieces over a rigid die surface with edges of adjacent pieces contacting each other in overlapping relationship, and adhering together the several pieces along surfaces of contact between pieces under pressure directed through the material to the rigid die surface.

8. The method of fabricating a structural assembly of molded wood or the like material, which comprises providing a plurality of thin pieces of the material each with curved edges throughout its periphery and bevelled to sharp angles between its opposite faces throughout its periphery, applying adhesive to the pieces, spreading the pieces over a rigid die surface with edges of adjacent pieces contacting each other in overlapping relationship, and adhering together the several pieces along surfaces of contact between pieces under pressure directed through the material to the rigid die surface.

9. The method of fabricating a structural assembly of molded wood or the like material, which comprises fabricating the material into thin pieces each with its edges bevelled to sharp angles between its opposite faces throughout its periphery, applying adhesive to the pieces, spreading the pieces on a rigid die surface with edges of adjacent pieces contacting each other in overlapping relationship, and adhering together the several pieces along surfaces of contact between pieces, under pressure directed through the material to the rigid die surface.

10. The method of fabricating a structural assembly of molded wood or the like material, which comprises fabricating the material into thin pieces each with its edges bevelled to sharp angles between its opposite faces throughout its periphery, applying adhesive to the pieces, spreading the pieces over a rigid die surface with proximate edges of adjacent pieces in overlapping relationship to form a ply, spreading a plurality of plies one on top of the other with pieces of adjacent plies in face to face contact, adhering together the several pieces along surfaces of contact between overlapping portions thereof and between pieces in face to face relationship, under pressure directed through the material to the rigid die surface.

11. The method of fabricating a structural assembly of molded wood or the like material, which comprises fabricating the material into thin pieces each with its edges bevelled to sharp angles between its opposite faces throughout its periphery, applying adhesive to the pieces, spreading the pieces over a rigid die surface presenting a predetermined curved contour conforming with the desired surface contour of the assembly, with edges of adjacent pieces contacting each other in overlapping relationship, and adhering together the several pieces along surfaces of contact between pieces, under pressure directed through the material to the rigid die surface.

12. The method of fabricating a structural assembly of molded wood or the like material having a natural structural grain, the method comprising, fabricating the material into thin elongated pieces, each piece having edges bevelled to sharp angles throughout its periphery, applying adhesive to the pieces, spreading the pieces over a rigid die surface with the bevelled portions of adjacent pieces in overlapping relationship, placing thereover further pieces with their grain lines disposed at an angle with respect to the grain lines of the underlying pieces, adhering together under pressure the several pieces along surfaces of contact between overlapping portions and between pieces lying face to face, the pressure being directed through the material to the rigid die surface.

SHERMAN M. FAIRCHILD.